United States Patent [19]

Ljung

[11] 4,410,274

[45] Oct. 18, 1983

[54] RING LASER GYROSCOPE WITH DOPPLER MIRRORS AND OFFSET ACTUATORS

[75] Inventor: Bo H. G. Ljung, Wayne, N.J.

[73] Assignee: The Singer Company, Little Falls, N.J.

[21] Appl. No.: 271,734

[22] Filed: Jun. 8, 1981

[51] Int. Cl.³ .............................................. G01C 19/64
[52] U.S. Cl. ..................................... 356/350; 372/94
[58] Field of Search .......................... 356/350; 372/94

[56] References Cited

U.S. PATENT DOCUMENTS 4,281,930 8/1981 Hutchings ........................... 356/350

*Primary Examiner*—Vincent P. McGraw
*Attorney, Agent, or Firm*—John C. Altmiller; T. W. Kennedy

[57] ABSTRACT

An equilateral triangular ring laser gyroscope contains drivers to vibrate two of the mirrors synchronously and oppositely along paths displaced by about 4.27° from the bisector of the vertex angles at which those mirrors are located. The magnitude of displacement is about 0.761 λ, where λ is the wavelength of laser radiation. The purpose of the vibration is to reduce the lock-in effect in the ring laser gyroscope.

4 Claims, 3 Drawing Figures

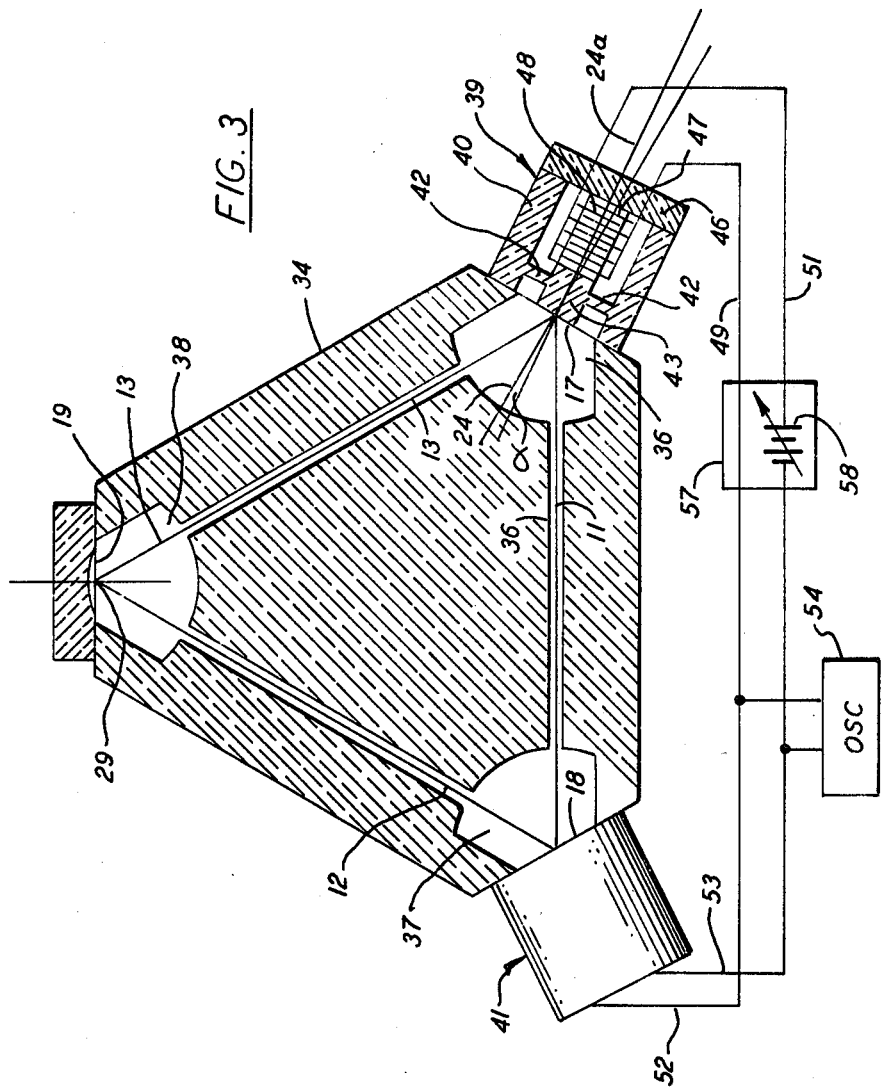

RING LASER GYROSCOPE WITH DOPPLER MIRRORS AND OFFSET ACTUATORS

This invention relates to the avoidance of lock-in in ring laser gyroscopes due to back scattered radiation from the mirrors. In particular, it relates to the avoidance of such lock-in by moving certain mirrors of an equilateral triangular gyroscope synchronously and in directions offset by a certain angle from the bisector of the respective vertex angle.

In ring laser gyroscopes two beams of monochromatic light traverse a closed optical path in opposite directions. The path encloses an area of a plane, and if the gyroscope is caused to rotate about an input axis that has a component normal to the plane, the velocity of one of the beams will be decreased and that of the other increased. This causes the frequency of one of the beams to be reduced and that of the other to be increased. By heterodyning the oppositely directed beams, the direction and rate of rotation about the axis can be measured from the beat frequency. Techniques for generating and heterodyning the waves are well-known and need not be described herein.

If the rate of rotation of the ring laser gyroscope is extremely slow, the frequencies of the beams lock together to a single frequency. As a result, the slowly rotating gyroscope produces the same output signal as if the gyroscope were stationary. It is necessary to be able to measure a rate of rotation as low as 0.001° per hour but the effect of lock-in makes it difficult to measure rates of rotation less than about 100° per hour. Therefore, the lock-in must be minimized. The necessity of measuring rates as low as a 0.001° per hour comes from requirements imposed on very accurate inertial navigation systems.

In a ring laser gyroscope each beam of light is reflected by a series of mirrors one after another around a closed, polygonal, optical path, usually a three-sided or four-sided path. Lock-in results from the fact that energy from each beam couples into the other beam. Each mirror specularly reflects most of the incident light, but a very small portion of the light scatters at each mirror due to minute imperfections.

One way that has been tried earlier to avoid lock-in is to produce a mechanical dithering motion of the gyroscope to produce the same effect as if the gyroscope were pivoted back and forth about the input axis. Dithering is described in U.S. Pat. No. 3,373,650 and if the gyroscope can be dithered at a rate that will cause the beams to have a frequency difference of several hundred hertz, they will not locked-in. This is true even if the gyroscope is rotated very slowly about its input axis.

Mechanical dithering implies that the input rate of the gyroscope is zero twice in each cycle. The ring laser gyro goes through lock-in, at least briefly, for each such time the input rate is zero. The effect of this is to increase the noise in the output signal from the ring laser gyroscope.

Another way to reduce or avoid lock-in is to use a Faraday medium to bias the two laser beams by direct frequency separation, as is also described in U.S. Pat. No. 3,373,650.

Still another way that has been suggested for avoiding lock-in is to introduce into the closed circuit path a beam of energy equal in amplitude but opposite in phase to the sum of undesired reflections. U.S. Pat. No. 3,323,411 describes apparatus for doing so.

Several schemes for reducing or eliminating the lock-in by biasing the ring laser gyroscope have been devised. However, none of them have been particularly successful compared with mechanical dithering. The reason for this is that all such schemes use methods that introduce a large bias that cannot be compensated without errors.

U.S. patent application Ser. No. 157,765, filed June 9, 1980, entitled "Phase Modulated Mirror For A Ring Laser Gyroscope", and assigned to the same assignee as the present case discloses a method and apparatus for avoiding lock-in by vibrating each mirror in a ring laser gyroscope from side to side an extremely small amount in its own plane without dithering the gyroscope at all. The instantaneous intensity of the back scattered radiation is modified in the same way as if the phase of that radiation were modulated. The equation for the instantaneous intensity can be solved using Bessel functions, and the argument of the Bessel functions is proportional to the distance each mirror is moved. By selecting the magnitude of motion of the mirrors to have certain values that correspond to zeros of the Bessel function, the intensity of the main back scattered radiation can be reduced to zero for the component of the back scattered radiation that is not shifted in frequency by the Doppler effect. This shifts all of the energy of the back scattered radiation to harmless side bands separated from the carrier frequency by integral multiples of the frequency of vibration, thereby minimizing or avoiding lock-in.

Vibrating all of the mirrors in planes parallel to their respective surfaces requires a relatively complex driver at each vertex: three for a triangular ring laser gyroscope, four for a rectangular one, etc. In addition, at least one mirror movable along a bisector of one vertex, i.e., perpendicular to the plane of the mirror is required to allow control of the length of the total optical path around the ring to adjust for expansion due to temperature changes.

U.S. patent application Ser. No. 274,044, filed June 15, 1981, in the names of Bo H. G. Ljung and John Stiles describes a triangular ring laser gyroscope in which only two of the three mirrors are vibrated in order to reduce the back scattered radiation at the main wavelength. The direction of vibration is perpendicular to the surfaces of the mirrors and along the respective bisector of the vertex angle of the beams that are reflected at that mirror. In an equilateral triangular ring laser gyroscope the magnitude of vibration can be selected to reduce the intensity of the back scattered radiation of the main wavelength to zero at the two vibrating mirrors while reducing it substantially, but not to zero, at the third mirror, which is held stationary. Or, in the same gyroscope, the magnitude of vibration can be chosen to reduce the intensity of the back scattered radiation of the main wavelength to zero at the stationary mirror while reducing it substantially, but not to zero, at the two vibrating mirrors. As a third alternative, the two mirrors can be vibrated by an amount that minimizes the total intensity of back-scattered radiation at all three mirrors in an equilateral triangular ring laser gyroscope to an aggregate minimum but does not reduce the intensity to zero at any of them.

The aforesaid Ljung and Stiles Application Ser. No. 274,044 does describe a triangular ring laser gyroscope in which the intensity of the back-scattered radiation can be reduced to zero at all three mirrors, but the triangle is an isosceles triangle with two angles of about 51.65°, where the two mirrors are vibrated along bisectors of the angle, and a third angle of about 76.70°, where the mirror is stationary. That embodiment is not as easy to manufacture as an embodiment in which the triangle is equilateral.

OBJECTS AND SUMMARY OF THE INVENTION

One of the objects of the present invention is to eliminate lock-in substantially or entirely in an equilateral triangular ring laser gyroscope by vibrating two of the mirrors of the gyroscope in directions slightly offset from the direction perpendicular to their reflective surfaces while keeping the total path length of the laser beams constant.

A still further object of the present invention is to provide an improved method of reducing or eliminating lock-in in an equilateral triangular ring laser gyroscope by vibrating two of its three mirrors, the direction and extent of vibration of each mirror being offset from the bisector of the respective angle while being equal and opposite in magnitude to that of the other mirror to maintain the total path length substantially constant while shifting the location of at least two of the path segments transversely to displace their intersections with each other and with the third path segment at the locations of the mirrors by an amount corresponding to a zero of the appropriate Bessel function.

In the case of an equilateral triangular optical path, the mirrors at two of the three vertex angles are vibrated synchronously, but in opposite directions relative to the interior of the triangular area bounded by the optical path, so that one of the vibrating mirrors moves toward the interior of the area along a line offset by a predetermined angle from the bisector of the vertex angle at that mirror, which tends to shorten the path length around the ring, while the other mirror simultaneously moves out along a line offset symmetrically by the same angle from the bisector of its vertex angle, which tends to increase the path length by an amount exactly equal at all times to the amount that the first mirror tended to shorten it. The third mirror is fixed. The magnitude of vibration is chosen so that the location of impingement of the light beams will be shifted at each of the mirrors by an amount that corresponds to a Bessel function zero.

The invention will be described in greater detail in the following written description together with the drawings.

BRIEF DESCRIPTION OF THE DRAWINGS

FIG. 3 is a simplified cross-sectional representation of a ring laser gyroscope using two of the actuators for vibrating the mirrors.

DETAILED DESCRIPTION OF THE INVENTION

Figure 1:
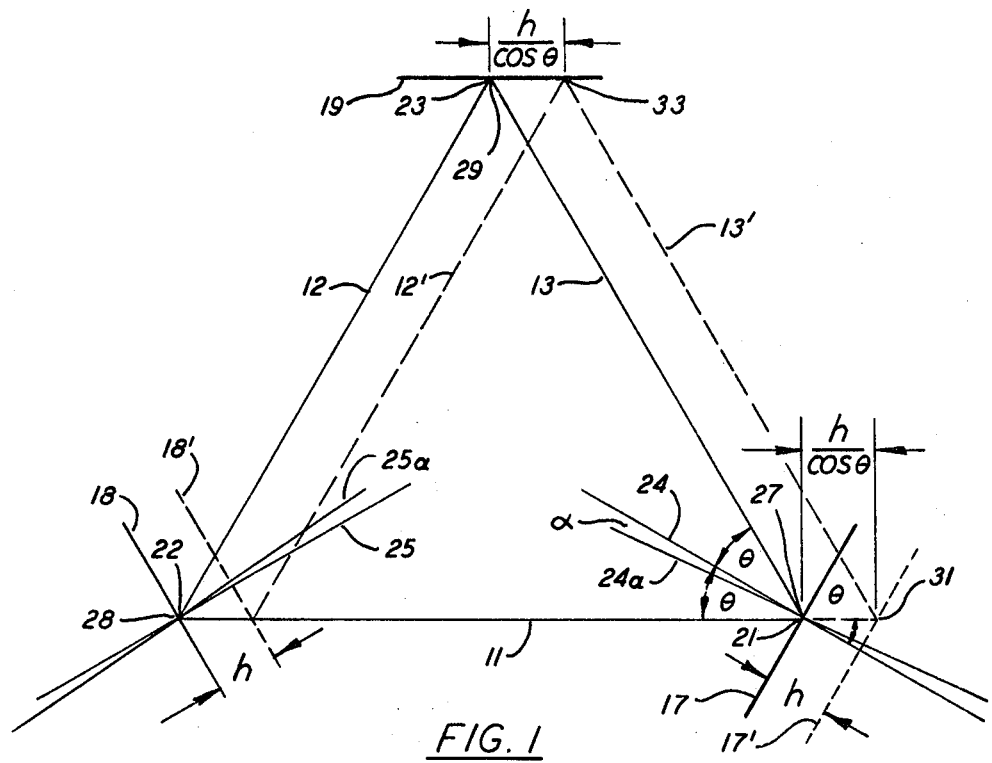
FIG. 1 is an optical diagram illustrating the application of the invention to an equilateral triangular ring laser gyroscope.

FIG. 1 shows a simplified optical diagram of an equilateral triangular ring laser gyroscope. In accordance with current practice, such a gyroscope would be constructed by creating a triangular cavity in a suitable block of solid material, filling the cavity with a suitable lasing material, such as a mixture of helium and neon, and energizing the lasing material by electric power applied to electrodes located in the block. All of these components are well-known, as is their mode of operation for producing two oppositely directed laser beams. Therefore, no detailed description of those components and other components for extracting a portion of the two beams and heterodyning the beams to measure the beat frequency need be given. What is important in the present invention is the optical arrangement for minimizing, with respect to each beam, that portion of the back scattered light that causes the lock-in effect.

The optical diagram in FIG. 1 shows three rays 11, 12 and 13 each representing two laser beams traveling in clockwise and counter clockwise directions around a triangular path within a ring laser gyroscope that includes three mirrors 17, 18 and 19. The rays 11, 12 and 13 may be considered to be axial rays of three bundles of light having a somewhat greater thickness than is represented by the individual rays 11, 12 and 13.

The included angle between the three vertexes 21, 22 and 23 of the triangular path are each, with $\theta = 60°$, since the triangle is equilateral.

In order for the mirrors 17, 18 and 19 to reflect the rays 11, 12 and 13 along the paths shown, these mirrors must be placed so as to be perpendicular to the respective bisectors 24, 25 and 26 of the vertex angles. Thus, at the vertex 21 where the rays 11 and 13 intersect the reflective surface of the mirror 17, the angle of incidence $\theta$ of the wave traveling in the clockwise direction is the same as that of the wave traveling in the counter clockwise direction.

Although the reflective surfaces of the mirrors 17, 18 and 19 defects are almost perfect, some defects remain. These defects are microscopic in size but are still large enough to cause the scattering of the incident light rays. The total amount of scattering is quite small, but there is some scattering in the reverse direction at each mirror. This means that, for a wave traveling along the ray 11 in the counter clockwise direction, the back scattered radiation would be in the same direction as the forward direction of a wave traveling along the ray 11 in the clockwise direction. Although the imperfections that produce back scattering are spread across the surface of each of the mirrors, they may be treated as if they were concentrated at one point on each mirror, such as the point 27 on the mirror 17, the point 28 on the mirror 18, and the point 29 on the mirror 19.

In U.S. patent application Ser. No. 157,765, filed June 9, 1980 supra, it was shown that sliding the mirrors, corresponding to the mirrors 17, 18 and 19 of the present application, laterally from side to side in the planes of their reflective surfaces could cause cancellation of the main back scattered ray at each mirror if the distance each mirror moved was properly chosen.

The aforesaid Ljung and Stiles application Ser. No. 274,044 shows that, by sinusoidally vibrating only two of the three mirrors in an equilateral triangular ring laser gyroscope by certain distances h along the respective bisectors of two of the vertex angles, the points of intersection of central rays of laser beams can be laterally shifted across those mirrors 17, 18 and 19 a distance $h \tan \theta$, where $\theta$ is the angle of incidence and is 30°, while the point of intersection at the third, stationary mirror is shifted by $h/\cos \theta$, which is exactly twice as great as $h \tan \theta$ for $\theta = 30°$. The importance of this is that h can be selected to make $h \tan \theta$ almost equal to the first zero, 2.405, of the Bessel function $J_0(B)$ while $h/\cos \theta$ is almost equal to the second zero, 5.52, thus reducing back scattered radiation of a main wavelength λ almost to zero.

According to the present invention, lateral displacement of the locations of the main scattering centers 27 and 28 on the mirrors 17 and 18, by the distance necessary to reduce back scattered radiation of the main wavelength λ to zero at all three mirrors, 17, 18 and 9 can be achieved by moving the mirrors 17 and 18 along paths displaced by a small angle from their perpendicular bisectors 24 and 15.

As in the aforesaid Ljung and Stiles application Ser. No. 274,044, it is only necessary to move two of the mirrors 17 and 18 instead of all three, but by moving them in the proper directions, total reduction of back scattered energy at the main wavelength at all three of the mirrors can be achieved.

In order to keep the diffraction losses low in the ring laser gyroscope, the reflective surface of the mirror 19 is actually spherically concave rather than planar, as the surfaces of the mirrors 17 and 19 are. However, the radius of curvature of the reflective surface of the mirror 19 is typically several meters, and because of the quite large radius of curvature, the mirror 19 may be treated mathematically as if it were planar like the other two.

It is essential that the total optical path length around a ring laser gyroscope be held at a fixed value at all times. Thus, it is not possible to move the mirror 17, alone, in a direction almost perpendicular to its surface. It is necessary to move the two mirrors 17 and 18 synchronously in opposite directions. If the mirror 17 is moved outwardly a distance h along a path 24a slightly offset by an angle α from the bisector 24 to the location 17′, the mirror 18 must be moved inwardly along a path 25a correspondingly offset from the bisector 25 to the position 18′. This causes the ray 11 to shift longitudinally to the right along its original path but displaces the rays 12 and 13 laterally to the paths 12′ and 13′, respectively. It also moves the back scattering centers 27 and 28 to the locations 27′ and 28′ where they are no longer on the ray 11 but are still within the areas of the mirrors 17 and 18 covered by the entire beam of which the ray 11 is only the central part. In fact, the ray 11 now impinges on the mirror at the location 17′ at a point 31 that is displaced from the new location 27′ of the scattering center by a distance $h \tan \theta - \Delta S$, where, as will be described in connection with FIG. 2, $\Delta S$ is $h \tan \alpha$. In order to impinge at this new location, the ray 11 has to travel an extra distance $h/\cos \theta$. The rays 11 and 12′ meet at the point 32 on the shifted mirror at location 18′ and the rays 12′ and 13′ meet at the point 33 on the mirror 19. The reflective surface of the mirror 19 is parallel to the ray 11, and the distance between the original location of the scattering center 29 prior to movement of the mirrors 17 and 18 and the point 33 will also be equal to $h/\cos \theta$.

Figure 2:
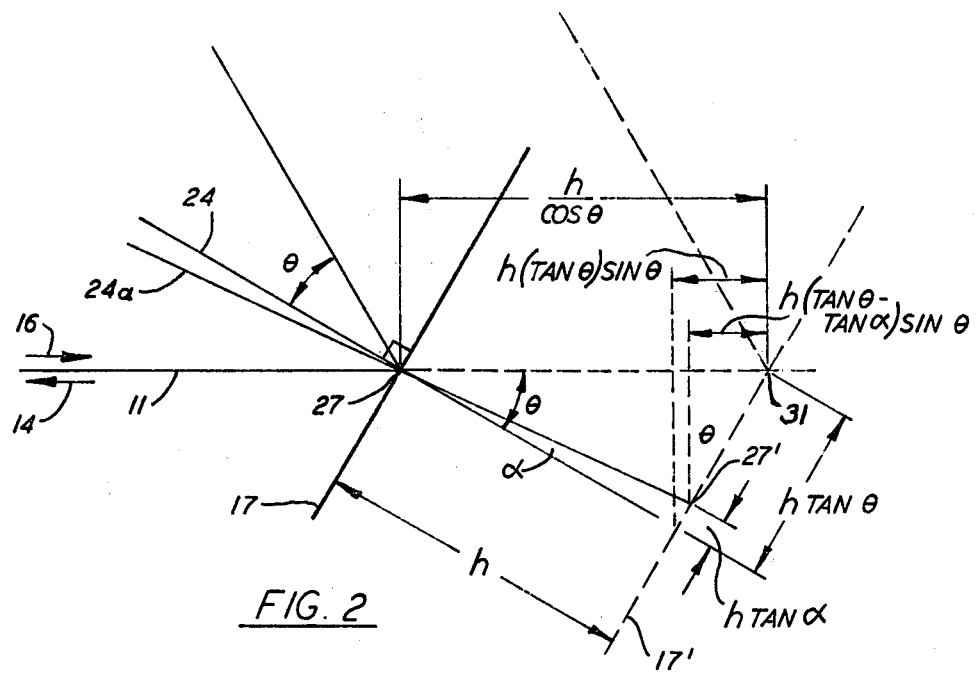
FIG. 2 is an enlargement of one corner of the diagram in FIG. 1 to make the geometric relationships more easily visible.

FIG. 2 shows the geometrical and phase relationships associated with moving the mirror 17 a distance h along the line 24a offset by the small angle α from the perpendicular bisector 24. A wave front of light traveling in the counter clockwise direction along the path 11 would have had a phase angle φ at the scattering center 27 with the mirror 17 in its original position. Part of the radiant energy of this wave would have been reflected back in the direction 14 along the same path 11. Shifting the mirror 17 to the position 17′ (and the mirror 18 correspondingly to keep the path length constant) would shift the scattering center to a corresponding new location 27′, still on the line 24a, which is assumed to pass through the mirror at the location of the vertex angle 21. It would also shift the entire beam, of which the ray 11 is only one ray, to the right by a distance $h/\cos \theta$ so that the wave front, which continues to reach the locations 31 with the same phase φ, would reach the location of a plane passing through the location 27′, and perpendicular to the ray 11, with a different phase, due to having to travel a distance that is shorter by an amount of $h \sin \theta (\tan \theta - \tan \alpha)$, which may simply be called $\Delta x$, i.e.

$$\Delta x = h \sin \theta (\tan \theta - \tan \alpha) \tag{1}$$

The phase of the back scattered wave changes by an amount proportional to twice that distance, or $2\Delta x$.

The change of phase, $\Delta\phi$, that takes place when the back scattered wave traverses a distance $2\Delta x$ is determined by the wavelength λ of the radiant energy according to the equation:

$$\Delta\phi = 2\Delta x \left( \frac{2\pi}{\lambda} \right) \tag{2}$$

It should be noticed that the same magnitude of phase change takes place with respect to back scattered waves that traverse the ring laser gyroscope in the opposite direction.

This is the same phase change that takes place in laterally shifted mirrors as described in application Ser. No. 157,765 referred to previously, but due to the fact that the mirror 17 in the present case is moved perpendicularly to its plane, the distance is different from the lateral shift distance since the apparent lateral shift of the scattering center from the location 27′ to the location 31 is $h (\tan \theta - \tan \alpha) \sin \theta$. The mirror moves sinusoidally at a frequency Ω and with a maximum excursion of h from a rest position and so the instantaneous distance h is:

$$h = H \sin \Omega t \tag{3}$$

Substituting the value of h from equation (3) into equation (1) gives the apparent lateral shift of the scattering center 17 at any instant as:

$$\Delta x = H (\tan \theta - \tan \alpha) \sin \theta \sin \Omega t \tag{4}$$

Substituting this value of $\Delta x$ into equation (2) gives $$\Delta\phi = \frac{4\pi H}{\lambda} (\tan \theta - \tan \alpha) \sin \theta \sin \Omega t \tag{5}$$

Since neither H nor θ nor α varies with time, the whole coefficient of $\sin \Omega t$ may be set equal to a constant B. That is:

$$\Delta\phi = B \sin \Omega t \tag{6}$$

in which $$B = \frac{4\pi H}{\lambda} (\tan \theta - \tan \alpha) \sin \theta \tag{7}$$

In this equilateral triangle ring laser gyroscope, θ is 30°, and $\sin \theta$ is ½. Thus $$B = \frac{2\pi H}{\lambda} (\tan \theta - \tan \alpha) \quad (8)$$

The scattered wave has an instantaneous amplitude e given by $$e = E \sin (\omega t + \Delta \phi) \quad (9)$$

in which E is the magnitude and $\omega$ is the angular frequency of the radiation. Substituting the value of $\Delta \phi$ from equation (6) into equation (9) gives:

$$e = E \sin (\omega t + B \sin \Omega t) \quad (10)$$

which is the same as the well-known equation for phase modulation of a carrier, having an angular frequency $\omega$, by a modulating wave having an angular frequency $\Omega$. Equation (10) when expanded in Bessel functions $J_n(B)$, becomes:

$$e = E\{J_0(B) \sin \omega t + J_1(B)[\sin (\omega + \Omega)t - \sin (\omega - \Omega)t] \quad (11)$$
$$+ J_2(B)[\sin (\omega + 2\Omega)t + \sin (\omega - 2\Omega)t]$$
$$+ J_3(B)[\sin (\omega + 3\Omega)t - \sin (\omega - 3\Omega)t]$$
$$+ \ldots$$

$J_0(B)$, in which $J_0$ is a Bessel function of the first kind and of order zero and B is its argument, represents the amplitude of an unmodified electromagnetic wave that would be called the carrier in frequency modulation of a radio frequency wave. It is well-known that $J_0(B)$ becomes zero, i.e., the amplitude of the carrier drops to zero, when the argument B has any one of certain values, of which only the arguments corresponding to the first and second zero are needed in this invention. These are:

$$B = 2.405$$
$$B = 5.520 \quad (12)$$

The importance of those values of the argument B in the present case is that they are values at which the amplitude of the unmodified frequency of the back scattered wave at the mirror 17 (and, as will be shown, at the mirror 19) reduces to zero. By selecting B to be one of these values, also known as zeroes of the Bessel function of the first kind and order zero, the effect of the unmodified back scattered wave becomes zero, and the only back scattered energy is in the sidebands, which are separated from the unmodified wave by integral multiples of $\Omega$. The angular frequency may be selected high enough so that the energy in the sidebands will not lock in with the main wave traveling in the same direction.

A value of H that will cause the amplitude of the unmodified, or carrier, back scattered wave to vanish can be calculated from equation (8). In order to determine a value of $\alpha$, which is the only quantity that remains unknown in that equation, the conditions at the mirror 19 must be examined. The mirror 19 remains stationary and the rays 12 and 13 shift laterally so that their point of reflection moves a distance h/cos $\theta$ from the location 29, when the mirrors 17 and 18 are in their respective unvibrated positions, to the location 33 when the mirrors 17 and 18 are caused to move a distance h. The difference in phase of the back scattered wave from the point 33 as compared to that from the point 29 is:

$$\Delta \phi = 2 \left( \frac{h}{\cos \theta} \right) \sin \theta \left( \frac{2\pi}{\lambda} \right) \quad (13)$$

in which the distance of the lateral shift is h/cos $\theta$ rather than h(tan $\theta$ — tan $\alpha$). It follows that equations (3) through (12) are also applicable, with the same substitution of 1/cos $\theta$ for (tan $\theta$ — tan $\alpha$) in equations (4), (5), (7), and (8). Making this substitution in equation (8) gives $$B = \frac{2\pi H}{\lambda \cos \theta} . \quad (14)$$

According to the present invention, the angular offset of the direction of movement of the mirror 17 can be chosen to reduce the lateral shifting of the spot 27' from the location 31 by an amount that allows B in equation (8) to be exactly equal to the first zero value when B in equation (14) is exactly equal to the second zero value. Thus the ratio of the left-hand side of equation (14) to the left hand side of equation (15) is equal to 2.405/5.52, or $$\frac{\frac{2\pi H (\tan \theta - \tan \alpha)}{\lambda}}{\frac{2\pi H}{\lambda \cos \theta}} = \frac{2.405}{5.52} \quad (15)$$

This reduces to $$\cos \theta \left( \frac{\sin \theta}{\cos \theta} \right) - \cos \theta \tan \alpha = .436 \quad (16)$$

Recognizing that sin 30° is ½ and cos 30° is 0.866, the value of tan $\alpha$ is shown to be:

$$\tan \alpha = \frac{.5 - .436}{.866} = .07426 \quad (17)$$

which is true for $$\alpha = 4.27° \quad (18).$$

The value of H when B in equation (14) is 2.405 is $$H = \frac{2.405\lambda}{6.28(.577 - .07426)} \quad (19)$$

which reduces to $$H = 0.761\lambda \quad (20).$$

If $\lambda$ is $6.328 \times 10^{-7}$m, equation (20) becomes $$H = 4.81 \times 10^{-}\text{m} \quad (21)$$

FIG. 3 shows, in greatly simplified form, a cross-sectional view of a triangular ring laser gyroscope constructed according to this invention. A block 34 of suitable material, such as quartz, has three channels 36, 37 and 38 bored in it. The three rays 11, 12 and 13 are formed substantially along the center lines of these channels, and the fixed mirror 19 at the intersection of the channels 37 and 38 is attached to the block 34 by any suitable means to reflect the rays 12 and 13. The mirror 17 that reflects the rays 11 and 13 is held by a driver 39, and a similar driver 41 holds the mirror 18.

The driver 39 consists of a block 40 of suitable material, such as cervit or zerodur, machined to form a thin membrane 42 that supports the mirror 17 at the end of a short central cylinder 43. On the other side of the membrane 42 from the cylinder 43 is a stack of piezoelectric crystal slabs 44 held in place between the membrane 42 and a rigid backstop 46 attached to the block 40. The piezoelectric crystals 44 have electrodes 47 and 48 on their opposite surfaces to be connected to a pair of terminals 49 and 51, respectively. Similar terminals 52 and 53 are connected to the driver 41.

The drivers 39 and 41 are actuated by a signal from an oscillator 54 that produces the modulating signal having the frequency and is connected so that the sinusoidal voltage applied to the driver 39 is 180° out of phase with the sinusoidal voltage applied to the driver 41. A path-length adjustment control 57 comprising, essentially, a variable direct voltage 58 is connected to provide a DC bias on the crystals 44 to adjust the total length of the path 11, 12 and 13. In accordance with this invention the axis of the stack is 24a, which is shown in FIG. 2. As described in connection with that figure, the axis 24a makes an angle of 4.27° with respect to the bisector 24 that intersects the mirror 17 in a direction perpendicular to its reflective surface. The axis 24a is also the axis of the driver 39 and of the short cylinder 43. In other words, this means that the driver 39 which is cylindrical in outside appearance, is attached to the block 34 at an angle of 145.73° to the channel 38. By symmetry, the driver 41 is also mounted on the block 34 at an angle of 145.73° to the channel 37, which places the axes of the drivers 39 and 41 at an angle of 308.54° to each other. Because of the way the mirror 17 is driven, it is convenient to use it for both path-length control and phase modulation of the rays 11, 12 and 13.

This invention has been described in terms of specific embodiments such as applies a triangular, but it will be recognized by those skilled in the art that modifications may be made therein without departing from the true scope of the invention as defined by the following claims.

What is claimed is:

1. A method of preventing lock-in in an equilateral triangular ring laser gyroscope that comprises three mirrors directing monochromatic beams of radiant energy of a predetermined wavelength $\lambda$ in opposite directions around a closed optical path, said method comprising vibrating first and second ones of the mirrors in first and second directions, respectively, to move the reflective surfaces of said first and second mirrors along first and second paths each offset by approximately 4.27° from the perpendicular to the reflective surfaces of said first and second mirrors, respectively, while maintaining the total length of the closed optical path constant to diminish back scattered radiation at the wavelength $\lambda$ from all of the mirrors substantially to zero, and in which the third one of the mirrors is held stationary.

2. The method according to claim 1 wherein each of said first and second mirrors is vibrated at an amplitude $H = 0.761\lambda$.

3. The method according to claim 1 wherein the wavelength $\lambda$ is $6.328 \times 10^{-7}$m and each of the first and second mirrors is vibrated at an amplitude $H = 4.81 \times 10^{-7}$m.

4. A ring laser gyroscope comprising:

laser means to produce two beams of monochromatic radiation at a predetermined wavelength $\lambda$ traveling in opposite directions around an equilateral triangular path of predetermined length enclosing an area bound by said path;

first, second, and third mirrors at the three vertexes of the path, respectively; and means to oscillate the first and second mirrors synchronously and sinusoidally according to the equation $h = 0.761\lambda \sin \Omega t$, where h is the displacement of each of the first and second mirrors at any instant and $\Omega$ is the angular frequency of vibration, in directions offset by 4.27° from the respective bisectors of the vertex angles at which the oscillated mirrors are located and 308.54° from each other, the first mirror moving toward the area to shorten the path length as the second mirror moves away from the area to maintain the total path length constant, the third mirror being stationary.

* * * * *